(12) United States Patent
McDonald

(10) Patent No.: US 9,404,403 B2
(45) Date of Patent: Aug. 2, 2016

(54) ENGINE OIL LEVEL MONITORING SYSTEMS AND METHODS

(75) Inventor: Mike M. McDonald, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1148 days.

(21) Appl. No.: 13/242,064

(22) Filed: Sep. 23, 2011

(65) Prior Publication Data

US 2013/0080022 A1 Mar. 28, 2013

(51) Int. Cl.
| | |
|---|---|
| G06F 19/00 | (2011.01) |
| F01M 11/12 | (2006.01) |
| F16H 57/04 | (2010.01) |
| F01M 11/10 | (2006.01) |
| F16N 19/00 | (2006.01) |

(52) U.S. Cl.
CPC .......... *F01M 11/12* (2013.01); *F16H 57/0447* (2013.01); *F01M 2011/14* (2013.01); *F01M 2011/1473* (2013.01); *F16N 19/006* (2013.01)

(58) Field of Classification Search
CPC .............. F16H 57/0447; F01M 11/12; F01M 2011/14; F01M 2011/1473; F16N 19/006
USPC ................................ 701/29.5, 102; 340/450.3
See application file for complete search history.

(56) References Cited

U.S. PATENT DOCUMENTS

| | | | |
|---|---|---|---|
| 1,432,346 A | 10/1922 | Lorenz | |
| 3,846,747 A | 11/1974 | Arai et al. | |
| 4,023,137 A | 5/1977 | Olsbo et al. | |
| 4,367,462 A | 1/1983 | Dressler | |
| 4,503,419 A * | 3/1985 | Kidd et al. | 340/450.3 |
| 5,019,800 A | 5/1991 | Gallert | |
| 5,060,608 A * | 10/1991 | Umemoto | 123/198 D |
| 5,159,313 A | 10/1992 | Kawai et al. | |
| 5,369,396 A | 11/1994 | Kurata et al. | |
| 5,831,154 A | 11/1998 | Guertler et al. | |
| 5,908,985 A | 6/1999 | Maatuk | |
| 6,301,947 B1 | 10/2001 | McCombs, Jr. | |
| 6,429,773 B1 | 8/2002 | Schuyler | |
| 6,640,644 B1 * | 11/2003 | Mireles et al. | 73/721 |
| 6,694,285 B1 * | 2/2004 | Choe et al. | 702/182 |
| 6,768,938 B2 * | 7/2004 | McBrien et al. | 701/100 |
| 6,914,524 B2 | 7/2005 | Berndorfer et al. | |
| 7,129,715 B2 | 10/2006 | Hayashi et al. | |
| 7,433,770 B2 * | 10/2008 | Inagawa et al. | 701/51 |
| 2002/0177960 A1 | 11/2002 | Berndorfer | |

(Continued)

FOREIGN PATENT DOCUMENTS

CN 101233302 A 7/2008

OTHER PUBLICATIONS

U.S. Appl. No. 13/082,798, filed Apr. 8, 2011, Mike M. McDonald.

(Continued)

*Primary Examiner* — Mahmoud Gimie
*Assistant Examiner* — David Hamaoui

(57) ABSTRACT

An oil monitoring system includes a level module, a limit module and an remedial action module. The level module is configured to determine N oil levels of an engine of a vehicle, where N is an integer greater than 1. The limit module is configured to determine an oil level trend based on the N oil levels and estimate when a level of oil in the engine is to be outside the predetermined range based on the oil level trend. The remedial action module is configured to perform a remedial action based on the estimate of when the level of the oil is to be outside the predetermined range.

18 Claims, 7 Drawing Sheets

(56) References Cited

U.S. PATENT DOCUMENTS

| | | | |
|---|---|---|---|
| 2003/0060949 A1 | 3/2003 | Letang et al. | |
| 2006/0037387 A1* | 2/2006 | Utz et al. | 73/117.3 |
| 2007/0113646 A1 | 5/2007 | Maatuk | |
| 2007/0169549 A1 | 7/2007 | Kwun et al. | |
| 2009/0076677 A1* | 3/2009 | Walthall et al. | 701/30 |
| 2009/0188755 A1* | 7/2009 | Staley et al. | 184/6.5 |
| 2012/0125442 A1 | 5/2012 | Sutherland et al. | |
| 2012/0259501 A1* | 10/2012 | McDonald | 701/29.5 |
| 2013/0227960 A1* | 9/2013 | Bonner | 60/783 |

OTHER PUBLICATIONS

Article entitled "Technical Information Electronics—Oil Sensors", Hella KGaA Hueck & Co., 8 pages, found at <http://www.hella.com/produktion/HellaUSA/WebSite/MiscContent/Download/AutoIndustry/E>lectronics/TI_Oelsensorik_GB_TT_05.pdf, date believed to be Aug. 29, 2005 (based on properties of online document).

Article entitled, "2009 Audi S5: Oil Level", Jason Kavanagh, Engineering Editor, Mar. 17, 2010, 3 pages, found at <http://www.edmunds.com/audi/s5/2009/long-term-road-test/2009-audi-s5-oil-level.html>.

Article entitled, "2009 BMW 7 Series Long Term Road Test, 2009 BMW 750i: Engine Oil Level at minimum!", Albert Austria, Senior Engineer, Feb. 1, 2010, 1 page, article found at: <http://www.edmunds.com/bmw/7-series/2009/long-term-road-test/2009-bmw-750i-engine-oil-level-at-minimum.html>.

* cited by examiner

ENGINE OIL LEVEL MONITORING SYSTEMS AND METHODS

CROSS-REFERENCE TO RELATED APPLICATIONS

This application is related to U.S. patent application Ser. No. 13/082,798 filed on Apr. 8, 2011. The disclosure of the above application is incorporated herein by reference in its entirety.

FIELD

The present disclosure relates to engine diagnostic and prognostic systems, and more particularly, to engine oil level monitoring systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Oil is circulated in an engine to lubricate moving components. An oil pump of the engine pumps oil from a sump to various locations within the engine. Gravity causes the oil to drain from the various locations in the engine to the sump. The oil pump may stop pumping the oil when the engine is switched OFF (or deactivated). A substantial portion of the oil returns to and remains in the sump when the engine is deactivated.

An oil level of an engine should be maintained within predetermined low and high limits to prevent damage to operating engine components. An operator may manually check an oil level of an engine when the engine is deactivated. This includes withdrawing a dipstick from a dipstick tube and/or a sump and observing where on the dipstick oil is deposited. Markings on the dipstick allow the operator to determine the oil level. The manual checking of an oil level has associated disadvantages. For example, an operator may check the oil level of an engine sporadically and/or infrequently. This can result in oil levels that are less than and/or greater than vehicle manufacturer recommended levels, which can ultimately degrade engine and/or emission system components and/or reduce operating efficiency of an engine.

SUMMARY

An oil monitoring system is provided and includes a level module, a limit module and a remedial action module. The level module is configured to determine N oil levels of an engine of a vehicle, where N is an integer greater than 1. The limit module is configured to determine an oil level trend based on the N oil levels and estimate when a level of oil in the engine is to be outside the predetermined range based on the oil level trend. The remedial action module is configured to perform a remedial action based on the estimate of when the level of the oil is to be outside the predetermined range.

In other features, a method of monitoring an oil level within an engine of a vehicle is provided. The method includes determining N oil levels of the engine, where N is an integer greater than 1. An oil level trend is determined based on the N oil levels. An estimate of when a level of oil in the engine is to be outside the predetermined range is determined based on the oil level trend. A remedial action is performed based on when the level of the oil is to be outside the predetermined range.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
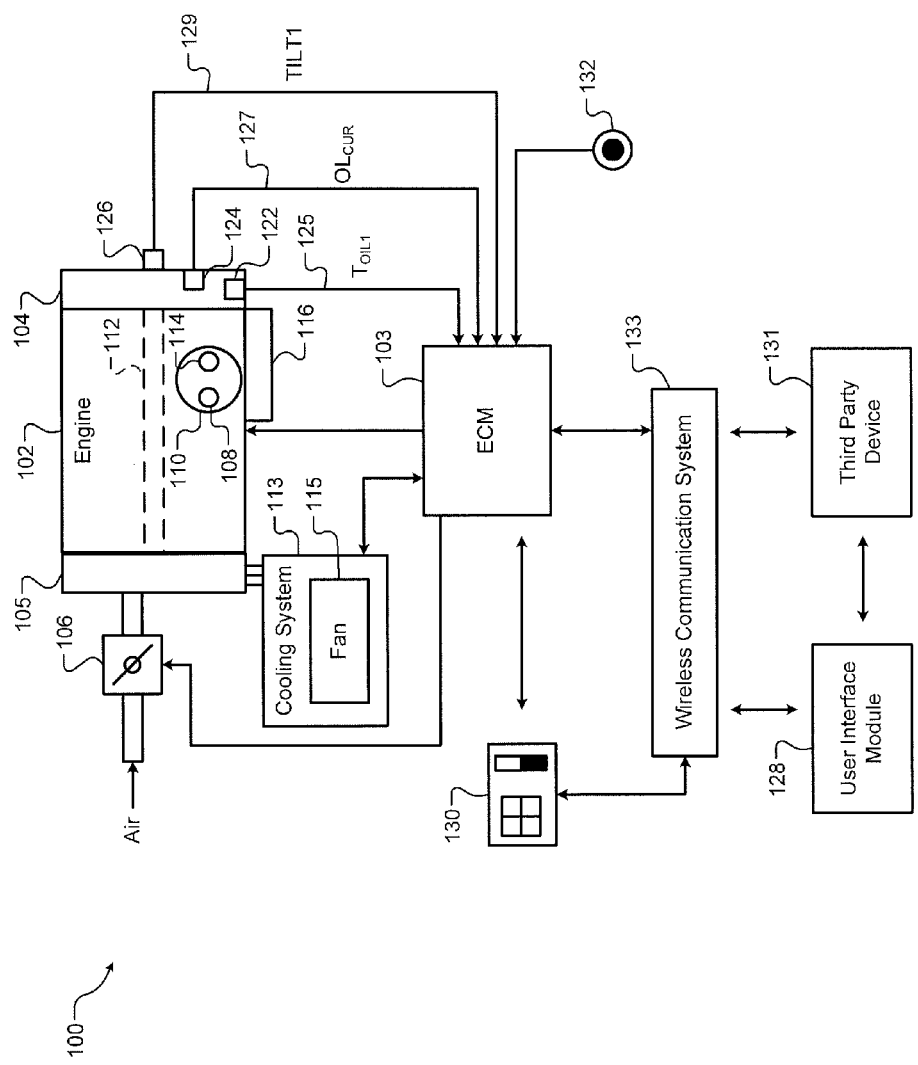
FIG. 1 is a functional block diagram of an engine oil level monitoring system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, classifications and/or modules, these elements, components, classifications and/or modules should not be limited by these terms. These terms may be only used to distinguish one element, component, classification or module from another element, component, classification or module. Terms such as "first," "second," and other numerical terms when used herein do not imply a sequence or order unless clearly indicated by the context. Thus, a first element, component, classification or module discussed below could be termed a second element, component, classification or module without departing from the teachings of the example embodiments.

In FIG. 1, an engine oil level monitoring system 100 is shown and includes an engine 102 and an engine control module (ECM) 103. The ECM 103 monitors oil levels of the engine 102 and/or levels of fluid(s) in an oil reservoir (e.g., oil pan) 104 of the engine 102. The fluid(s) may primarily or entirely include engine oil. However, in certain circumstances the fluid(s) may also include fuel and/or coolant. For example, clearances between piston rings and cylinder walls of an engine may change over time. As a result, fuel may leak, seep and/or be pushed past piston rings of the engine 102 and into the oil reservoir 104, which can cause an engine oil level to rise. As an example, engine coolant may leak into the oil via damaged gaskets or cracks in various engine components. Oil level(s) or level(s) of fluid(s) in the reservoir 104 are referred to hereinafter as oil level(s).

The ECM 103 determines whether the oil levels are outside a predetermined range (less than a first threshold or greater than a second threshold) and/or estimates when the oil levels are expected to be outside a predetermined range. The ECM 103 reports the oil levels, when the oil levels are outside a predetermined range, and/or when the oil levels are expected to be outside a predetermined range to a user and/or a third party. The ECM 103 may also perform remedial actions based on this reported information. The remedial actions are described below.

The engine 102 generates drive torque for a vehicle and may be, for example, a spark-ignition engine, a diesel engine, a compression-ignition engine or suitable type of engine. Air is drawn into the engine 102 through an intake manifold 105. Airflow into the engine 102 may be varied using a throttle valve 106. One or more fuel injectors, such as a fuel injector 108, mix fuel with the air to form an air/fuel mixture. The air/fuel mixture is combusted within cylinders of the engine 102, such as a cylinder 110. The engine 102 may include any number of cylinders.

The cylinder 110 includes a piston (not shown) that is mechanically linked to a crankshaft 112. One combustion cycle within the cylinder 110 may include four phases: an intake phase, a compression phase, a combustion phase, and an exhaust phase. Combustion of the air/fuel mixture drives the piston and rotates the crankshaft 112. Resulting exhaust gas is expelled from the cylinder 110 through an exhaust manifold 116 to complete the exhaust phase and the combustion cycle. The engine 102 outputs torque to a transmission (not shown) via the crankshaft 112. The engine 102 may be cooled via a cooling system 113, which may include a cooling fan 115.

The oil reservoir 104 may be an oil sump and stores oil that lubricates moving parts in the engine 102. The oil reservoir 104 may be located at or near the bottom of the engine 102. When the engine 102 is running, an oil pump (not shown) may pump oil from the oil reservoir 104 to other locations in the engine 102. Gravity may cause oil to return to the oil reservoir 104. When the engine 102 is switched OFF, the oil pump may stop pumping oil, and a substantial portion of the oil may return to and remain in the oil reservoir 104. The engine 102 is OFF (or deactivated), for example, when fuel and/or spark is disabled. The speed of the engine 102 may be 0 revolutions-per-minute (rpm) when the engine 102 is OFF.

The ECM 103 controls position of the throttle valve 106, fuel supplied to the fuel injector 108, and timing of the fuel injector 108 and the spark plug 114. The ECM 103 may control the throttle valve 106, the fuel injector 108, and the spark plug 114 based on an oil level of the engine 102. For example, the ECM 103 may limit speed of the engine 102 when the oil level is less than a predetermined threshold.

The engine oil level monitoring system 100 may further include various sensors. For example, the sensors may include a temperature sensor 122, an oil level sensor 124, and a tilt sensor 126. The temperature sensor 122 detects temperatures of oil in the engine 102 and/or fluids in the oil reservoir 104. The temperature sensor 122 outputs an oil temperature signal $T_{OIL1}$ (125) indicating the oil temperature. The oil level sensor 124 detects a level of oil in the engine 102 and/or a level of oil (or fluids) in the oil reservoir 104 and outputs an oil level signal $OL_{CUR}$ (127) indicating a present oil level. The tilt sensor 126 detects tilt of the vehicle with respect to gravity and outputs a first tilt signal TILT1 (129) indicating tilt of the vehicle.

The temperature sensor 122 and the oil level sensor 124 may be integrated into one sensor. The oil level sensor 124 may be located at the bottom of the oil reservoir 104 and may measure a fluid level by transmitting an ultrasonic wave into fluid(s) in the oil reservoir 104. The oil level sensor 124 may measure the time that elapses while the ultrasonic wave is reflected back to the oil level sensor 124 from a top surface of the fluid(s). The oil level sensor 124 may measure the level of the fluid(s) based on the elapsed time.

The engine oil level monitoring system 100 may include a user interface module (UIM) 128 and/or a third party device 131. The UIM 128 may request an oil level check and/or display the oil level to a user. The oil level and/or status of the oil level may be displayed via the UIM 128 and/or a display 130. The status of the oil level may indicate whether the current oil level is low, within a normal operating range, or high. Other status information is described herein. An estimated volume of the oil may also be provided. The display 130 may be, for example, a touchscreen in an instrument panel of the vehicle. The UIM 128 may be, for example, a mobile device, a laptop computer, or a desktop computer. The UIM 128 transmits a user request signal to the ECM 103 using a wired or wireless medium. The ECM 103 transmits the oil level and/or status of the oil level to the UIM 128 in response to the user request signal. The ECM 103 may also transmit the oil level and/or status of the oil level to the third party device 131. The third party device 131 may be, for example, a module and/or computer of a service provider, manufacturer, central processing office, etc. The third party device 131 may also be a control module of a vehicle other than the vehicle in which the engine 102 is located.

Signals transmitted between: the UIM 128 and the ECM 103; the UIM 128 and the display 130; the UIM 128 and the third party device 131; the ECM 103 and the display 130; and the ECM 103 and the third party device 131 may be over wired and/or wireless mediums. Signals transmitted to and from the ECM 103 and/or the display 130 may be transmitted and received via a communication system 133. The communication system 133 may be a telematics system, a Wi-Fi™ based communication system, or other suitable communication system. As an example, the wireless communication system 133 may use dedicated short-range communications (DSRC) channels when communicating with the UIM 128, the display 130, and/or the third party device 131.

The engine oil level monitoring system 100 may be implemented in an engine with a stop-start system. The engine oil level monitoring system 100 may monitor shut down (deactivation) of the engine 102 that is performed to reduce the amount of time the engine 102 is idling. This improves fuel economy and reduces emissions. The engine 102 may be shut down (referred to as an autostop) when vehicle speed is less than a threshold for a predetermined period. During an autostop, the engine 102 may be shut down and/or transitioned to an at rest state (i.e. engine speed is equal to 0 revolutions/second). The engine 102 may be automatically started (referred to as an autostart), for example, when an accelerator pedal is actuated and/or an automatic transmission is transitioned from a drive (D) position. For example, when an accelerator pedal is pushed from an at rest position and/or a shifter of an automatic transmission is transitioned from a drive (D) position to a neutral (N) position, a reverse (R) position, a first gear (D1) position, a second gear (D2) position, etc., an autostart may be performed to reactivate the engine 102.

The ECM 103 may monitor oil levels of the engine 102 during each shutdown of the engine 102 or period when the engine 102 is OFF and/or after the engine 102 has been shutdown for at least a drain time. The drain time may refer to a predetermined amount of engine OFF time (e.g., between 2 and 30 minutes), which when exceeded a predetermined percentage (or amount) of oil has drained back into the oil reservoir 104. The ECM 103 may determine the engine OFF time based on when, for example, the ECM 103 receives a deactivate signal.

The deactivate signal may be generated based on a key OFF signal from an ignition key cylinder sensor (not shown) and/or an engine start/stop signal from a start/stop button 132. The start/stop button 132 enables the user to manually start and stop the engine 102. The start/stop button 132 may output the engine start/stop signal to the ECM 103. The ECM 103 starts and stops the engine 102 in response to the engine start/stop signal.

In operation, the engine oil level monitoring system 100 may perform automatic checking of oil levels of an engine 102 and enable users to manually request an oil level check via the UIM 128 and/or display 130. Detected oil levels may be displayed and/or reported to a user and/or the third party device 131. The oil levels may be determined by the ECM 103 or other suitable module of the vehicle based on oil monitoring conditions.

The oil monitoring parameters and/or conditions, which may include, for example, an oil temperature, an indication that the engine 102 is OFF, an amount of time that the engine 102 is OFF, an amount of vehicle tilt, etc. The oil levels may be determined, for example, when the oil temperature is greater than a predetermined temperature, the engine OFF time is greater than a predetermined drain time, and/or the amount of vehicle tilt is less than a predetermined angle. The detected oil levels may be modified based on the oil temperature, which may be measured using the temperature sensor 122. Oil is allowed to drain into an oil reservoir 104 when the engine is OFF, which may be determined based on the oil temperature, an engine type, an oil type and/or and oil viscosity grade.

The oil viscosity grade is the viscosity of oil at a reference temperature. The oil viscosity grade may affect the drain time because oil having a high viscosity grade drains slower than oil having a low viscosity grade. The oil temperature may affect the drain time because oil viscosity is directly related to oil temperature. Thus, as oil is heated, the viscosity of the oil decreases and the drain time of the oil decreases. Conversely, as the oil is cooled, the viscosity of the oil increases and the drain time of the oil increases. The type of the engine 102 can affect the drain time because different engine types may have different oil passage configurations, such as different oil passage diameters, which may affect oil flow.

Figure 2:
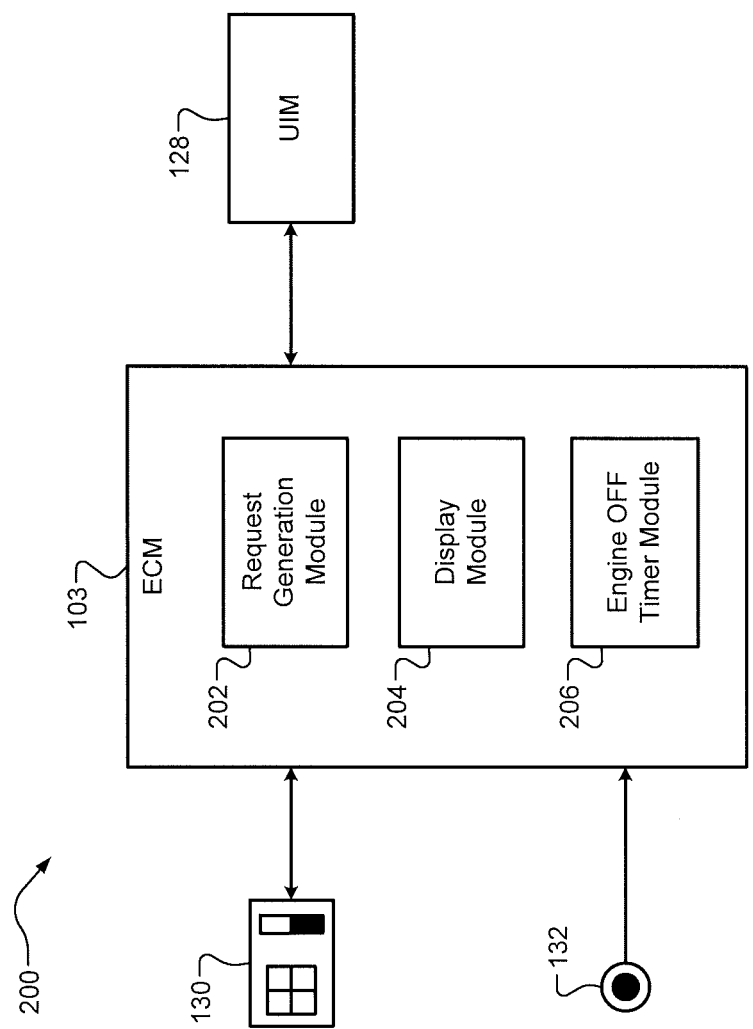
FIG. 2 is a functional block diagram of a portion of the engine oil level monitoring system illustrating a user interface module in accordance with the present disclosure.

In FIG. 2, a first portion 200 of the engine oil level monitoring system 100 is shown. The first portion 200 includes the ECM 103, the UIM 128, and the display 130. The ECM 103 and/or the UIM 128 may include a request generation module 202, a display module 204, and/or an engine OFF timer module 206. The modules 202-206 are shown as being incorporated in the ECM 103 in FIG. 2. The modules 202-206 are shown as being incorporated in the UIM 128 in FIG. 2 of U.S. patent application Ser. No. 13/082,798.

The request generation module 202 receives a user input signal from the UIM 128 and/or from the display 130 and generates an oil level request signal based on the user input signal. The request generation module 202 outputs the oil level request signal to the ECM 103. The ECM 103 determines and provides an oil level to the display module 204 based on the oil level request signal. The oil level request signal may be a previous level request or a present level request. The previous level request is generated to request a previous oil level, which may be the oil level most recently measured. The present level request is generated to request a present oil level, which may be measured when oil monitoring parameters satisfy certain criteria. For example, the present oil level may be determined when the engine 102 is OFF for a predetermined amount of time and tilt of the vehicle is level relative to gravity.

The display module 204 may send the previous and present oil levels to the UIM 128 and/or the display 130. When a present oil level is requested, the ECM 103 may inform the UIM 128 and/or the display 130 that the ECM 103 accepts the present level request. In turn, the display module 204 may be used to control the UIM 128 and/or the display 130 to display a user message acknowledging the present level request. For example, the user message may instruct the user to park the vehicle on level ground and inform the user that an oil level check will occur at the next opportunity after the engine 102 is shut OFF.

The engine OFF timer module 206 determines an engine OFF time, which starts when the engine 102 is switched OFF and may stop when the engine 102 is switched ON. The engine OFF timer module 206 may determine the engine OFF time based on an input received from the start/stop button 132. For example, the engine OFF timer module 206 may start incrementing the engine OFF time when the start/stop button 132 is pressed to switch the engine 102 OFF and/or when a detected speed of the engine 102 is 0 rpm.

Figure 3:
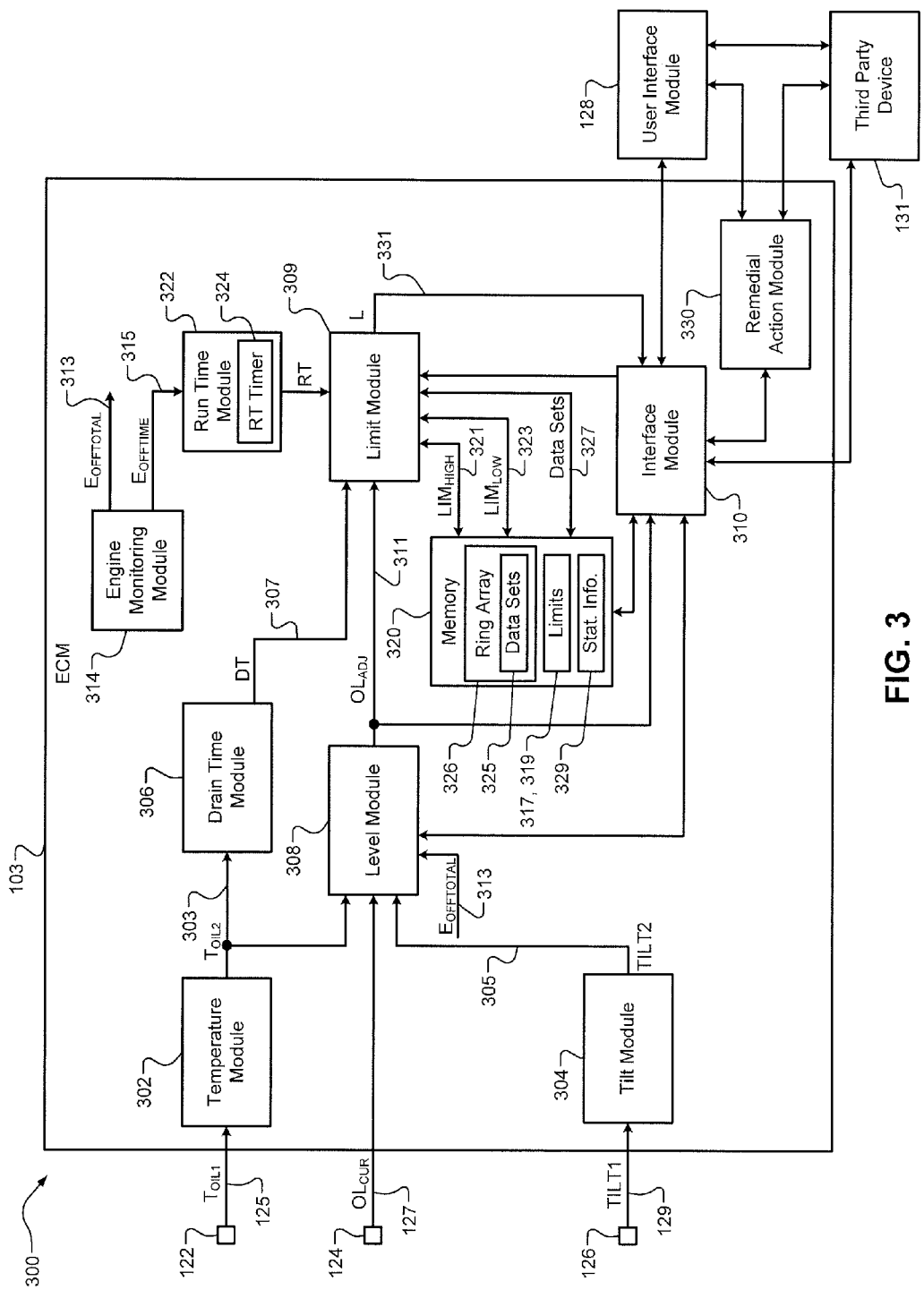
FIG. 3 is a functional block diagram of another portion of the engine oil level monitoring system illustrating an engine control module in accordance with the present disclosure.

In FIG. 3, a second portion 300 of the engine oil level monitoring system 100 is shown. The second portion 300 includes the ECM 103, the temperature sensor 122, the oil level sensor 124, the tilt sensor 126, the UIM 128 and the third party device 131. The ECM 103 includes a temperature module 302, a tilt module 304, a drain time module 306, a level module 308, a limit module 309, and an interface module 310.

The temperature module 302 determines an oil temperature based on a first oil temperature signal $T_{OIL1}$ from the oil temperature sensor 122. The temperature module 302 may determine the oil temperature based on the oil temperature signal and a predefined relationship between the oil temperature signal and the oil temperature. This relationship may be represented as an equation and/or provided in a lookup table. Alternatively, the temperature module 302 may determine the oil temperature based on vehicle operating conditions, such as an ambient temperature and an engine-on time (i.e., a time during which the engine 102 is switched on). The temperature module 302 outputs the oil temperature as a second oil temperature signal $T_{OIL2}$ (303).

The tilt module 304 determines the tilt of the vehicle with respect to gravity. The tilt module 304 may determine the tilt based on the first tilt signal TILT1 and a predefined relationship between the first tilt signal TILT1 and the tilt. This relationship may be represented as an equation and/or provided in a lookup table. The tilt module 304 outputs the tilt as a second tilt signal TILT2 (305).

The drain time module 306 determines a drain time represented as a drain time signal DT (307). The drain time is a time (e.g., between 2 and 30 minutes) during which oil is allowed to drain back into the oil reservoir 104 while the engine 102 is OFF. The drain time module 306 may determine the drain time based on the oil temperature, an engine type, an oil type, and/or an oil viscosity grade. The drain time module 306 may determine the drain time using an equation and/or a lookup table relating one or more of these factors to the drain time. The drain time module 306 may output the drain time signal DT to the limit module 309.

The level module 308 determines the oil level of the engine 102. The level module 308 may determine the oil level based on the present oil level signal $OL_{CUR}$ and a predefined relationship between the present oil level signal $OL_{CUR}$ and the oil level. Alternatively, the level module 308 may determine the oil level based on a predefined relationship between the oil level and one or more of the: present oil level signal $OL_{CUR}$; the second oil temperature $T_{OIL2}$, the tilt of the vehicle TILT1, and an amount of time that the engine 102 is OFF (i.e. engine OFF time $E_{OFFTOTAL}$). These relationships may be represented as one or more equations and/or provided via one or more lookup tables. The level module 308 may generate an adjusted oil level signal $OL_{ADJ}$ (311) based on the signals and/or parameters received by the level module 308.

The level module 308 may determine the oil level at predetermined times, periodically, during selected engine OFF periods, and/or when instructed. The level module 308 may be instructed to determine an oil level via the interface module 310, the UIM 128, the third party device 131 or other suitable module. The predetermined times may be specified in terms of vehicle miles (e.g., every 500 miles), the number of hours that the engine 102 has operated (e.g., every 10 hours), and/or the number of times that the engine 102 is switched OFF (e.g., every 5 times).

In addition, the level module 308 may determine the oil level when oil monitoring parameters and/or conditions satisfy certain criteria, such as when the engine 102 is switched OFF and tilt of the vehicle is level. For example, the level module 308 may determine the oil level when the oil temperature is greater than a predetermined temperature; an amount of time that the engine 102 is OFF (referred to as engine OFF time $E_{OFFTOTAL}$ (313)) is greater than the drain time; and/or the tilt of the vehicle is less than a predetermined angle (e.g., 30 degrees). The level module 308 may receive the engine OFF time $E_{OFFTOTAL}$ from an engine monitoring module 314. The engine monitoring module 314 may determine the engine OFF time $E_{OFFTOTAL}$ and a time when the engine is deactivated $E_{OFFTIME}$ (315).

The limit module 309 determines trends of detected oil levels. Based on the trends, the limit module 309 predicts or estimates when the oil level of the engine 102 is to exceed a high level threshold $LIM_{HIGH}$ (317) or a low level threshold $LIM_{LOW}$ (319). The oil level has exceeded the limit $LIM_{HIGH}$ when the oil level is greater than the $LIM_{HIGH}$. The oil level has exceeded the limit $LIM_{LOW}$ when the oil level is less than the $LIM_{LOW}$. The thresholds $LIM_{HIGH}$, $LIM_{LOW}$ may be stored in memory 320 and accessed via the limit module 309. Corresponding limit signals 321, 323 that indicate the thresholds $LIM_{HIGH}$, $LIM_{LOW}$ are shown.

The limit module 309 may store a data set in the memory 320 for each oil level determined. Each of the data sets 325 includes a present adjusted oil level (e.g., $OL_{ADJ}$), a corresponding cumulative run time RT, and a corresponding slope b, which are indicated via a data set signal 327. The cumulative run time RT may be provided via a run time module 322. The run time module 322 may include a cumulative run time timer 324 that determines a cumulative amount of time that the engine 102 has been ON (referred to as cumulative run time RT).

The cumulative run time RT may be a total amount of time that the engine 102 has been activated during the life of the engine 102. Alternatively, the cumulative run time RT may be measured from a reference time such as the last time an oil change was detected. The run time module 322 may increment the cumulative run time RT based on the engine OFF time $E_{OFFTIME}$. For example, when the engine OFF time $E_{OFFTIME}$ is LOW indicating that the engine 102 is running, the cumulative engine RT may be incremented. The cumulative run time RT is used to calculate the slope b between first and second oil level points. The slope b is the slope of a line extending between 2 points. The first point refers to a previously determined oil level and the second point refers to a presently determined oil level. This is further described below with respect to FIGS. 6 and 7.

The data sets 325 may be stored in a ring array 326 of the memory 320. The ring array 326 stores a predetermined number of data sets (e.g., 20). Once the ring array 326 is filled to capacity with the latest determined data sets, the oldest one of the data sets 325 is removed from the ring array 326 when an additional data set is generated. In other words, the ring array 326 stores a predetermined number of the most recently generated data sets and discards other data sets.

The limit module 309 may indicate oil level status information (329) such as: whether the presently adjusted oil level $OL_{ADJ}$ has exceeded one of the thresholds $LIM_{HIGH}$, $LIM_{LOW}$; and the estimated amount of time when one of the thresholds $LIM_{HIGH}$, $LIM_{LOW}$ is to be exceeded via a limit signal L (331). The status information may be stored in the memory 320.

The interface module 310 may store the presently adjusted oil level $OL_{ADJ}$ in the memory 320. The interface module 310 outputs: the presently adjusted oil level $OL_{ADJ}$; whether the thresholds $LIM_{HIGH}$, $LIM_{LOW}$ have been exceeded; and the estimated amount of time when one of the thresholds $LIM_{HIGH}$, $LIM_{LOW}$ is estimated to be exceeded to the UIM 128, the display 130, and/or the third party device 131. This may occur automatically or based on a user request.

If an oil level request is a previous oil level request, the interface module 310 may output a previous oil level to the UIM 128, the display 130, and/or the third party device 131. The previous oil level may be the oil level most recently measured. If the oil level request is a present oil level request, the interface module 310 may inform the UIM 128, the display 130, and/or the third party device 131 that the ECM 103 accepts the present level request. In addition, the interface module 310 may instruct the level module 308 to determine a present oil level. In response, the level module 308 may determine the present oil level and may output the present oil level to the interface module 310. The interface module 310 may then output the present oil level to the UIM 128, the display 130, and/or the third party device 131.

The ECM 103 may also include a remedial action module 330. The remedial action module 330 may perform one or more remedial actions based on: previously and/or presently adjusted oil levels; whether the thresholds $LIM_{HIGH}$, $LIM_{LOW}$ have been exceeded; the estimated amount of time when one of the thresholds $LIM_{HIGH}$, $LIM_{LOW}$ is to be exceeded; and/or level classifications. Level classifications are described below with respect to FIG. 6.

As an example, the ECM 103 may limit speed of the engine 102 to a predetermined speed when one of the thresholds $LIM_{HIGH}$, $LIM_{LOW}$ has been exceeded and/or a present oil level of the ECM 103 is within a predetermined range of one of the thresholds $LIM_{HIGH}$, $LIM_{LOW}$. The ECM 103 may send warning messages to and/or display warning messages on the UIM 128, the display 130 and/or the third party device 131. The warning messages may indicate: that one of the thresholds $LIM_{HIGH}$, $LIM_{LOW}$ has been exceeded; previous and present oil levels; the thresholds $LIM_{HIGH}$, $LIM_{LOW}$; when one of the thresholds $LIM_{HIGH}$, $LIM_{LOW}$ is expected to be exceeded; how long until one of the thresholds $LIM_{HIGH}$, $LIM_{LOW}$ is to be exceeded; a check engine notice; etc. The warning messages may also include, for example, directions, addresses and/or contact information of a service center. The warning messages may indicate that oil should be added or removed from the engine 102. Additional example warning messages are described below with respect to the method of FIG. 6.

Figure 4:
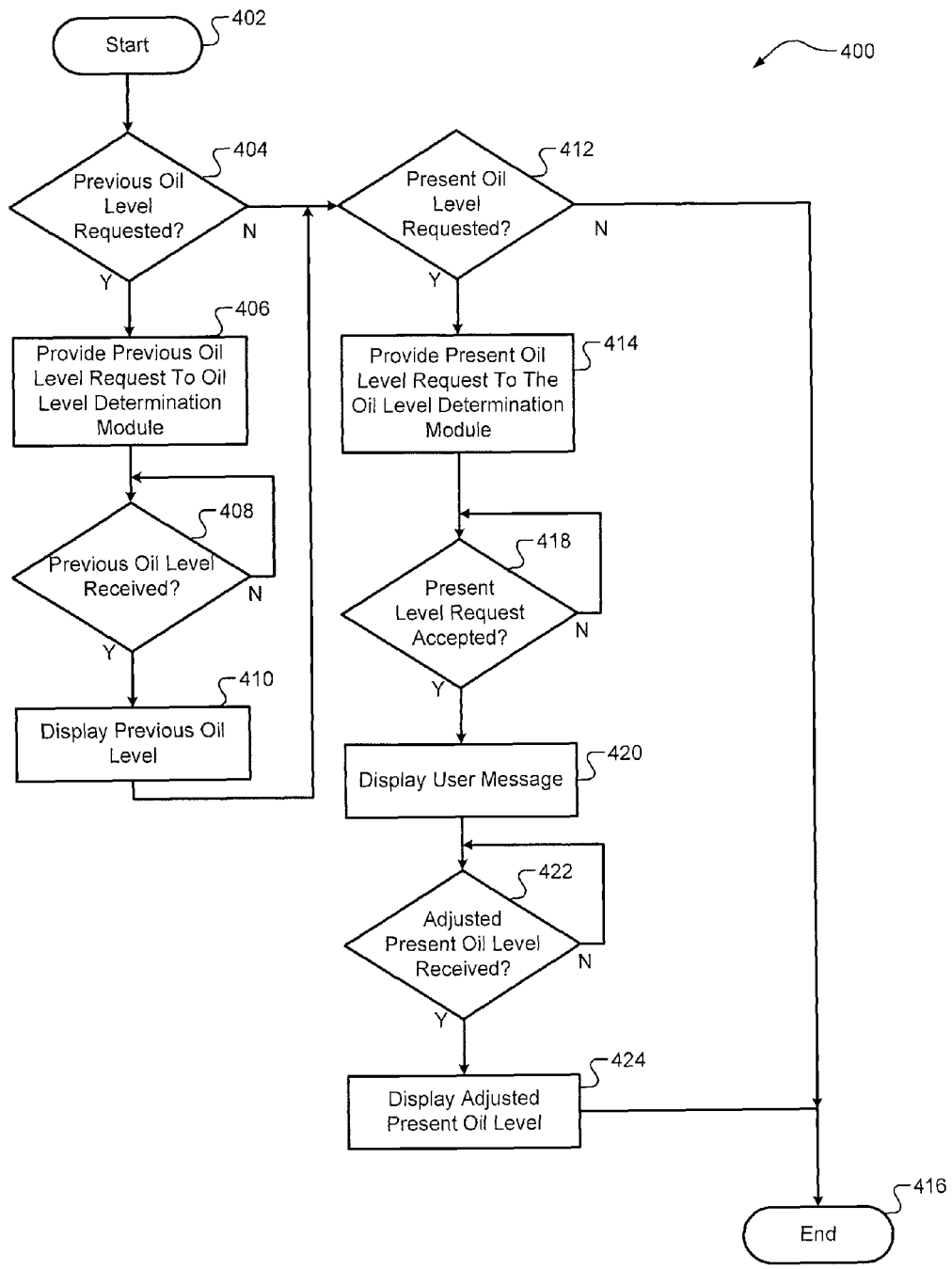
FIG. 4 illustrates a method of monitoring engine oil in accordance with the present disclosure.
Figure 5:
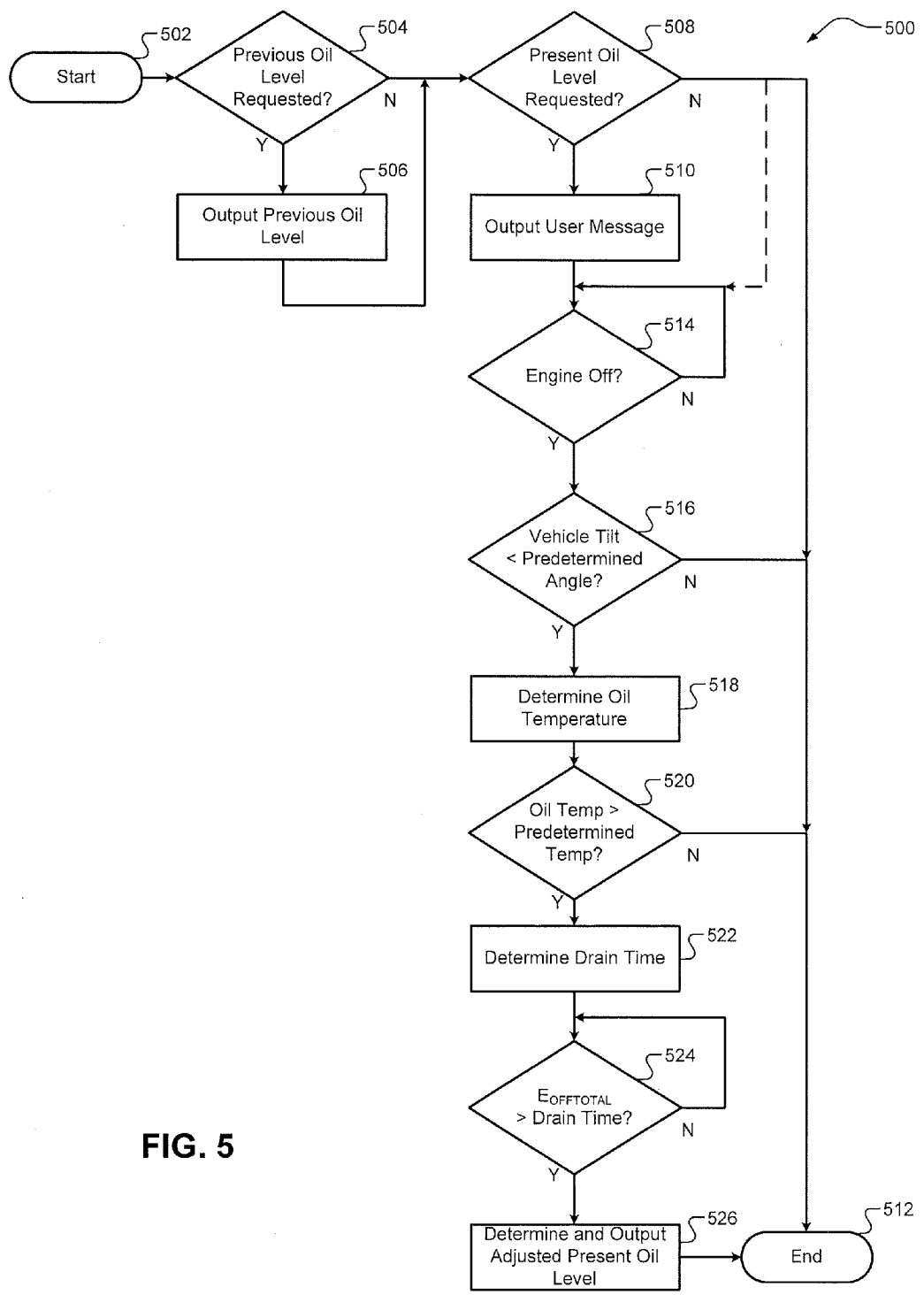
FIG. 5 illustrates another method of monitoring engine oil including vehicle tilt, oil temperature, and engine OFF time compensation in accordance with the present disclosure.
Figure 6:
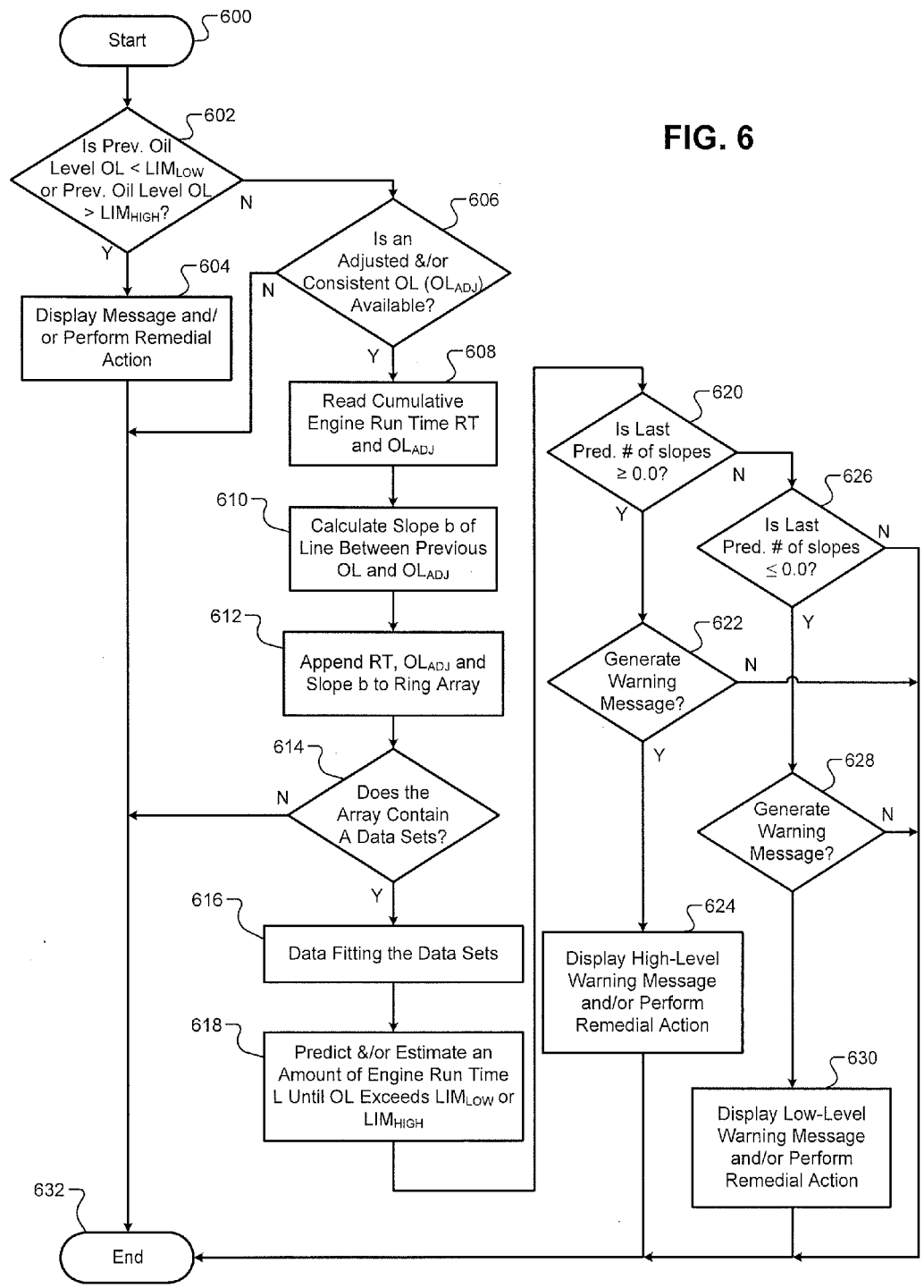
FIG. 6 illustrates yet another method of monitoring engine oil including providing oil level prognostics in accordance with the present disclosure.

The engine oil level monitoring system 100 may be operated using numerous methods. Example methods are shown in FIGS. 4-6. The methods may be performed separately or two or more of the methods may be combined and used as a single method.

In FIG. 4, a first method of operating the engine oil level monitoring system is shown. Although the following tasks are primarily described with respect to the implementations of FIGS. 1-3, the tasks may be easily modified to apply to other implementations of the present disclosure. The tasks of the methods may be iteratively performed. The method may begin at 402 and may be executed by the ECM 103 and/or by the UIM 128.

At 404, the ECM 103 and/or level module 308 determines whether a previous oil level request is received and/or generated. The previous oil level request may be generated within the ECM 103 and/or generated and received from the UIM 128, the display 130, and/or the third party device 131. Task 406 is performed when a previous oil level is requested, otherwise task 412 is performed.

At 406, the previous oil level request may be provided to the oil level module 308. At 408, the oil level module 308 determines whether a previous oil level has been determined and/or received from memory. Task 410 is performed when a previous oil level has been determined and stored in the memory. At 410, the interface module 310 and/or the remedial action module 330 may display and/or transmit the previous oil level to the UIM 128, the display 130 and/or the third party device 131. The interface module 310 and/or the remedial action module 330 may also display and/or transmit the date, time, and vehicle mileage corresponding to the previous oil level to the UIM 128, the display 130, and/or the third party device 131.

At 412, the ECM 103 and/or the oil level module 308 determines whether a present oil level request is received and/or generated. The present oil level request may be generated within the ECM 103 and/or generated and received from the UIM 128, the display 130, and/or the third party device 131. Task 414 is performed when a present oil level is requested, otherwise the method may end at 416.

At 414, the present oil level request is provided to the oil level module 308. At 418, the ECM 103 determines whether the present oil level request is accepted. If the present oil level request is accepted, task 420 is performed. At 420, an instruction message may be displayed on the UIM 128, the display 130 and/or at the third party device 131. The instruction message may instruct the user to park the vehicle on level ground and inform the user that an oil level check is to be performed at a next opportunity after key-OFF.

At 422, the oil level module 308 determines whether an adjusted present oil level (e.g., $OL_{ADJ}$) has been determined and/or received from memory. Task 424 is performed when an adjusted previous oil level has been determined and stored in the memory. At 424, the interface module 310 and/or the remedial action module 330 displays and/or transmits the adjusted present oil level to the UIM 128, the display 130 and/or the third party device 131. The interface module 310 and/or the remedial action module 330 may also display and/or transmit the date, time, and vehicle mileage corresponding to the present oil level to the UIM 128, the display 130, and/or the third party device 131.

Referring now to FIG. 5, an engine oil monitoring method 500 is shown and may begin at 502. The method 500 may be executed by the ECM 103. At 504, the oil level module 308 determines whether a previous oil level is requested. Task 506 is performed when a previous oil level is requested, otherwise task 508 is performed.

At 506, the interface module 310 and/or the remedial action module 330 outputs the previous oil level. The method 500 may output the previous oil level to the UIM 128, the display 130, and/or the third party device 131. The interface module 310 and/or the remedial action module 330 may also output the date, time, and vehicle mileage corresponding to the previous oil level to the UIM 128, the display 130, and/or the third party device 131.

At 508, the oil level module 308 determines whether a present oil level is requested. Task 510 is performed when a present oil level is requested, otherwise the method may end at 512. At predetermined times, the method may continue from task 508 to task 514 rather than end at 512 when a present oil request has not been received. The predetermined times may be specified in terms of vehicle miles, a number of hours that an engine is operated, and/or a number of times that the engine is switched OFF.

At 510, the interface module 310 may output a message acknowledging receipt of the present oil level request to the UIM 128, the display 130 and/or third party device 131.

At 514, the engine monitoring module 314 determines whether the engine 102 is switched OFF. Task 516 is performed when the engine 102 is switched OFF. At 516, the tilt module 304 determines whether tilt of the vehicle is less than a predetermined angle (e.g., 30 degrees). Task 518 may be performed when the tilt of the vehicle is less than the predetermined angle. As an alternative, when oil level determination is performed based on compensation for tilt, task 518 may be performed when the tilt is greater than or equal to the predetermined angle. The method may end at 512 when task 518 is not performed.

At 518, the temperature module 302 determines an oil temperature. At 520, the ECM 103 may determine whether the oil temperature is greater than a predetermined temperature. The predetermined temperature may be a temperature (e.g., zero degrees Celsius) below which an oil level sensor does not function properly. Task 522 may be performed when the oil temperature is greater than the predetermined temperature, otherwise the method may end at 512.

At 522, the drain time module 306 may determine a drain time, as described above. The drain time may be determined based on the oil temperature, an engine type, an oil type, and/or an oil viscosity grade. At 524, the ECM 103 determines whether an amount of time since the engine 102 was last deactivated (e.g., $E_{OFFTOTAL}$) and has remained deactivated is greater than the drain time. Task 526 is performed when the amount of time that the engine has been OFF is greater than the drain time.

At 526, the oil level module 308, the interface module 310 and/or the remedial action module 330 determine the adjusted present oil level and output the adjusted present oil level to the UIM 128, the display 130 and/or the third party device 131. The adjusted present oil level may be determined based on the oil temperature (e.g., $T_{OIL2}$), the present oil level (e.g., $OL_{CUR}$), the tilt of the vehicle (e.g., TILT2), and the amount of time that the engine 102 has remained OFF. This allows the level module 308 to compensate for temperature of oil in the engine 102, off-level tilt of the vehicle, and an amount of time that the vehicle has remained OFF.

In FIG. 6, another method of monitoring engine oil including providing oil level prognostics is shown. The method may begin at 600 and may be performed by the ECM 103.

At 602, the ECM 103 and/or the limit module 309 may determine whether a previous oil level is less than limit $LIM_{LOW}$, greater than limit $LIM_{HIGH}$ or in other words is outside a predetermined range defined by the limits $LIM_{LOW}$, $LIM_{HIGH}$. If one of the limits $LIM_{LOW}$, $LIM_{HIGH}$ has been exceeded task 604 is performed, otherwise task 606 is performed.

At 604, the interface module 310 and/or the remedial action module 330 may display or transmit a message to the UIM 128, the display 130, and/or the third party device 131 indicating that one of the limits $LIM_{LOW}$, $LIM_{HIGH}$ has been exceeded. The ECM 103 and/or the remedial action module 330 may perform a remedial action as described above to prevent damage to vehicle and/or engine components.

At 606, the ECM 103 determines whether an adjusted and/or consistent oil level (e.g., $OL_{ADJ}$) is available. In one implementation, an oil level is a consistent oil level when the oil level is determined after the engine 102 has remained OFF for the drain time. In another implementation, the oil level is a consistent oil level when the oil level is determined after the engine 102 has remained OFF for the drain time and tilt and/or oil temperature compensation has been performed. An adjusted and consistent oil level is an oil level that is determined after the most recent deactivation of the engine 102. Task 608 is performed when an adjusted and/or consistent oil level is available (i.e. stored in the memory 320), otherwise the method may end at 632. The adjusted and consistent oil levels when determined are stored in the memory 320.

At 608, the limit module 309 reads the adjusted and consistent oil level and the most recently determined previous oil level (or the last two most recently determined oil levels) from the memory 320.

At 610, the limit module 309 determines a slope b between the adjusted and/or consistent oil level and a most recently determined previous oil level. The most recently determined previous oil level is an oil level determined prior to the adjusted and/or consistent oil level and is the most recently determined oil level other than the adjusted and/or consistent oil level. The limit module 309 also reads from the memory 320 cumulative engine run times corresponding to the adjusted and/or consistent oil level and the most recently determined previous oil level.

Figure 7:
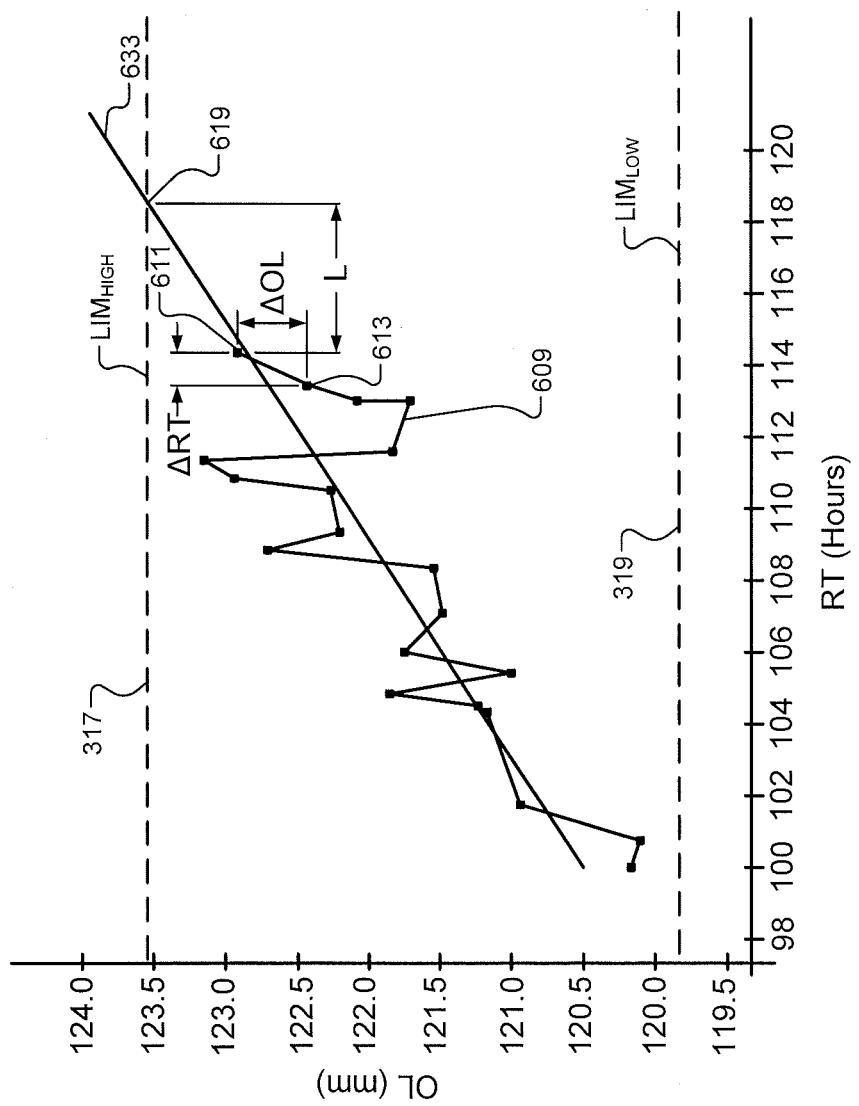
FIG. 7 is a plot of oil levels versus cumulative engine run times in accordance with the present disclosure.

Referring now also to FIG. 7, an example plot of oil levels OL versus cumulative engine run times RT and corresponding curve 609 is shown. The oil levels were adjusted and consistent oil levels when generated. The most recent oil level (designated point 611) is the adjusted and consistent oil level until another adjusted and consistent oil level is determined. The oil level designated 613 is the most recently determined previous oil level. Thus, as an example, slope b (i.e. change in OL divided by change in cumulative run time $\Delta OL/\Delta RT$) of the line segment between point 611 and point 613 is determined. Although FIG. 7 illustrates an oil level trend of increasing oil levels, a similar plot may be generated for a trend of decreasing oil levels.

At 612, the slope b determined at 610 is stored along with the adjusted and/or consistent oil level and the corresponding cumulative engine run time as a data set in the ring array 326.

At 614, the limit module 309 determines whether a predetermined number of data sets (e.g., 20) are stored in the ring array 326. Task 616 is performed when there is a predetermined number of data sets 325 stored in the ring array 326, otherwise the method may end at 632. Task 614 is performed to allow the limit module 309 to generate a trend line based on the data sets 325 and estimate when the oil level of the vehicle is to exceed one of the limits $LIM_{HIGH}$ (317) or $LIM_{LOW}$ (319). By determining that the ring array 326 has the predetermined number of data sets, the limit module 309 assures that there is a sufficient number of data sets to prevent a single outlier (or inaccurate) data set from significantly affecting the data fitting process and/or a resulting oil level trend (i.e. position and/or slope of the trend line). The number of data sets stored in the ring array 326 may be greater than or equal to the predetermined number of data sets. An example trend line 633 is shown in FIG. 7.

At 616, the limit module 309 performs data fitting to generate the trend line based on the data sets 325. The limit module 309 may use various data fitting techniques to generate the trend line. Example data fitting techniques are linear regression, a first order least squares method, and a multi-order least squares method.

At 618, the limit module 309 predicts and/or estimates when the oil level of the vehicle will exceed one of the limits $LIM_{LOW}$, $LIM_{HIGH}$. A data fit equation may be used to predict and/or estimate when the oil level of the vehicle will exceed one of the limits $LIM_{LOW}$, $LIM_{HIGH}$ based on the data sets, the trend line, and the limits $LIM_{LOW}$, $LIM_{HIGH}$. A predicted and/or estimated time L may be indicated as: a cumulative run time when one of the limits is to be exceeded; a difference in cumulative engine run time; a date when one of the limits is to be exceeded based on average engine run time per day; a number of engine run time hours until one of the limits is to be exceeded, a number of vehicle miles until one of the limits is to be exceeded, etc. An example of a predicted and/or estimated time L is shown in FIG. 7 as a difference in cumulative engine run time from the most recently determined oil level 611 and a point 619 associated with the oil level equaling one of the limits $LIM_{LOW}$, $LIM_{HIGH}$ (e.g., the limit $LIM_{HIGH}$). The predicted and/or estimated time L may also be determined for a decreasing oil level trend.

At 620, the remedial action module 330 determines whether the last predetermined number of slope calculations (e.g., last 3 slope calculations) are each greater than or equal to 0.0. Task 622 may be performed when each of the last predetermined number of slope calculations is greater than or equal to 0.0, otherwise task 626 is performed. The oil level of the vehicle is increasing when task 622 is performed. As an alternative, the remedial action module 330 may determine whether a slope of the trend line is greater than or equal to 0.0 and proceed to task 622 when the slope of the trend line is greater than or equal to 0.0.

At 622, the remedial action module 330 determines whether to generate a warning message based on the predicted and/or estimated time L and a predetermined number of level classifications. Each level classification may have one or more associated time thresholds. The number of level classifications and the time thresholds may be set based on a type of the engine 102, a type of oil in the engine 102, a type of the vehicle, etc. Any number of level classifications and time thresholds may be used and set according to when each type of warning message is to be generated. The ECM 103 may set and/or adjust the time thresholds based on an average amount of engine run time between stop/start cycles of the engine 102.

As an example, 3 level classifications may be used for each of two conditions. The first condition refers to when the oil level is increasing and has classifications (C1H, C2H, C3H). The second condition refers to when the oil level is decreasing and has classifications (C1L, C2L, C3L).

The remedial action module 330 compares the predicted and/or estimated time L with a first time threshold L1 (e.g., 1 hour) and a second time threshold L2 (e.g., 5 hours). The first time threshold L1 is less than the second time threshold L2. For classification C1H, a warning message is not generated when the predicted and/or estimated time L is greater than the second time threshold L2. For classification C2H, a first warning message is generated when the predicted and/or estimated time L is greater than or equal to the first time threshold L1 and less than or equal to the second time threshold L2. For classification C3H, a second warning message is generated when the predicted and/or estimated time L is less than the first time threshold L1. Task 624 is performed when a warning message is generated, otherwise the method may end at 632.

At 624, the remedial action module 330 generates either the first warning message or the second warning message. The first and second warning messages may indicate, for example, that the oil level is estimated to be too high after the predicted and/or estimated time L. The first warning message may also suggest that the vehicle operator drive the vehicle to a service station to drain some oil from the engine 102 at an earliest convenient opportunity. The second warning message may also request that the vehicle operator drive the vehicle to a service station to drain some oil from the engine 102 soon (or within a predetermined amount of time). The first and second warning messages may provide directions to a service center. The first and second warning messages may be transmitted to the UIM 128 and/or to the display 130. A message indicating the same (and/or a status of the oil level) may be transmitted to the third party device 131 to indicate a current status of the oil level to a third party. The third party may than perform actions to prevent the oil level from exceeding the limit $LIM_{HIGH}$.

At 624, the remedial action module 330 may perform additional remedial actions in addition to generating a warning message. For example, the remedial action module 330 may limit speed of the engine 102, reduce temperature of the engine 102 to reduce level of the oil, or perform some other suitable remedial action. The remedial action module 330 may signal the cooling system 113 to reduce temperature of the engine 102. The cooling system 113 may, for example, activate the cooling fan 115 and/or maintain the cooling fan 115 in an ON state for an extended period of time or until the temperature of the engine is less than a predetermined temperature. The ECM 103 may adjust spark timing, fuel timing and/or amounts, and/or air flow to the engine 102 to decrease temperature of the engine 102.

At 626, the remedial action module 330 determines whether the last predetermined number of slope calculations (e.g., last 3 slope calculations) are each less than or equal to 0.0. Task 628 may be performed when each of the last predetermined number of slope calculations is less than or equal to 0.0, otherwise the method may end at 632. The oil level of the vehicle is decreasing when task 628 is performed. As an alternative, the remedial action module 330 may determine whether a slope of the trend line is less than or equal to 0.0 and proceed to task 628 when the slope of the trend line is less than or equal to 0.0.

At 628, the remedial action module 330 determines whether to generate a warning message based on the predicted and/or estimated time L. The remedial action module 330 compares the predicted and/or estimated time L with a third time threshold L3 (e.g., 1 hour) and a fourth time threshold L4 (e.g., 5 hours). The third time threshold L3 may be different than the first time threshold L1. The fourth time threshold L4 may be different than the second time threshold L2.

The third time threshold L3 is less than the fourth time threshold L4. For classification C1L, a warning message is not generated when the predicted and/or estimated time L is greater than the fourth time threshold L4. For classification C2L, a third warning message is generated when the predicted and/or estimated time L is greater than or equal to the third time threshold L3 and less than or equal to the fourth time threshold L4. For classification C3L, a fourth warning message is generated when the predicted and/or estimated time L is less than the third time threshold L3. Task 630 is performed when a warning message is generated, otherwise the method may end at 632.

At 630, the remedial action module 330 generates either the third warning message or the fourth warning message. The third and fourth warning messages may indicate, for example, that the oil level is estimated to be too low after the predicted and/or estimated time L. The third warning message may also suggest that the vehicle operator drive the vehicle to a service station to add some oil to the engine 102 at an earliest convenient opportunity. The fourth warning message may also request that the vehicle operator drive the vehicle to a service station to add some oil to the engine soon (or within a predetermined amount of time). The third and fourth warning messages may provide directions to a service center. The third and fourth warning messages may be transmitted to the UIM 128 and/or to the display 130. A message indicating the same (and/or a status of the oil level) may be transmitted to the third party device 131 to indicate a current status of the oil level to a third party. The third party may than perform actions to prevent the oil level from exceeding the limit $LIM_{LOW}$.

At 630, the remedial action module 330 may perform additional remedial actions in addition to generating a warning message. For example, the remedial action module 330 may limit speed of the engine 102, increase temperature of the engine 102 to increase level of the oil, or perform some other suitable remedial action. The remedial action module 330 may signal the cooling system 113 to increase temperature of the engine 102. The cooling system 113 may, for example, deactivate the cooling fan 115 for an extended period of time or until the temperature of the engine is greater than a predetermined temperature. The ECM 103 may adjust spark timing, fuel timing and/or amounts, and/or air flow to the engine 102 to increase temperature of the engine 102.

The above-described tasks of FIGS. 4-6 are meant to be illustrative examples; the tasks may be performed sequentially, synchronously, simultaneously, continuously, during overlapping time periods or in a different order depending upon the application.

The above-described implementations provide a vehicle operator and/or owner that an oil level of a vehicle is trending to exceed a limit. This enables the vehicle operator and/or owner to perform remedial actions to prevent damage to components of the vehicle. This reduces warranty costs due to oil over or under fill events (oil level less than a low limit or greater than a high limit). This also prevents high oil level events (oil level greater than a high limit) for a diesel engine, which prevents the diesel engine from continuing to run after a key OFF event.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An oil monitoring system comprising:
a run time module configured to determine an amount of time an engine of a vehicle is off;
a drain time module configured to determine an amount of time for oil in the engine to drain;
a control module configured to determine whether the amount of time the engine is off is greater than the amount of time for the oil to drain;
a level module configured to (i) determine N oil levels of the engine, where N is an integer greater than 1, and (ii) adjust, based on a tilt level of the vehicle or a temperature of the oil, one of the N oil levels if the amount of time the engine is off is greater than amount of time for the oil to drain;
a limit module configured to (i) determine an oil level trend based on the N oil levels including the adjusted one of the N oil levels, and (ii) estimate when a level of the oil in the engine is to be outside a predetermined range based on the oil level trend, wherein the limit module is configured to, during respective stop-start cycles of the engine, determine a plurality of slopes of oil level versus cumulative engine run time curves based on pairs of the N oil levels and respective cumulative engine run times; and
a remedial action module configured to (i) perform a remedial action based on when the level of the oil is estimated to be outside the predetermined range, and (ii) generate a warning message based collectively on the plurality of slopes.

2. The oil monitoring system of claim 1, further comprising:
a temperature module configured to determine the temperature of the oil; and
a tilt module configured to determine the tilt level of the vehicle,
wherein the level module is configured to determine the one of the N oil levels based on the temperature and the tilt level of the vehicle.

3. The oil monitoring system of claim 1, wherein:
the limit module is configured to determine a slope of an oil level versus cumulative engine run time curve based on a last two most recently determined ones of the N oil levels and respective cumulative engine run times; and
the remedial action module is configured to generate the warning message based on the slope of the oil level versus cumulative engine run time curve determined based on the last two most recently determined ones of the N oil levels and respective cumulative engine run times.

4. The oil monitoring system of claim 1, wherein:
the limit module is configured to estimate an amount of time until the level of the oil in the engine will be outside the predetermined range; and
the remedial action module is configured to compare the amount of time to time thresholds of M level classifications and generate the warning message based on one of the M level classifications.

5. The oil monitoring system of claim 1, wherein:
the limit module is configured to estimate an amount of time until the level of the oil in the engine will be outside the predetermined range;
the remedial action module is configured to
compare the amount of time to a first time threshold and to a second time threshold,
perform a first remedial action when the amount of time is greater than the first time threshold and less than the second time threshold, and
perform a second remedial action when the amount of time is less than the first time threshold; and
the first time threshold is less than the second time threshold.

6. The oil monitoring system of claim 5, wherein the remedial action module is configured to:
generate a first warning message when the amount of time is greater than the first time threshold and less than the second time threshold, and
generate a second warning message when the amount of time is less than the first time threshold.

7. The oil monitoring system of claim 1, wherein:
the run time module is configured to determine an average amount of engine run time between the stop-start cycles of the engine, wherein the average amount of engine run time refers to an average amount of time the engine is ON between consecutive ones of the stop-start cycles;
the limit module is configured to
determine a time threshold based on the average amount of engine run time,
store data sets in memory, wherein each of the data sets is associated with a respective one of the stop-start cycles of the engine,
determine a slope of an oil level versus cumulative engine run time curve based on two of the N oil levels and respective cumulative engine run times for each of the stop-start cycles of the engine, wherein the plurality of slopes include the slopes determined for the stop-start cycles of the engine, and wherein each of the data sets includes one of the N oil levels, a cumulative engine run time corresponding to the one of the N oil levels, and one of the plurality of slopes, and estimate an amount of time until the level of the oil in the engine is outside the predetermined range based on the data sets; and the remedial action module is configured to perform the remedial action based on the time threshold and the amount of time until the level of the oil in the engine is outside the predetermined range.

8. The oil monitoring system of claim 7, wherein the limit module is configured to:

data fit the data sets to generate a trend line; and determine when the level of the oil in the engine is to be outside the predetermined range based on the trend line.

9. The oil monitoring system of claim 1, wherein the drain time module is configured to determine the amount of time for the oil to drain based on a temperature of the oil, a type of the engine, a type of the oil, and a viscosity level of the oil.

10. The oil monitoring system of claim 1, wherein:

the limit module is configured to determine the oil level trend if the amount of time the engine is off is greater than the amount of time for the oil to drain, store the oil level trend, the adjusted one of the N oil levels and one of the cumulative engine run times as a first data set in a ring array, generate a trend line based on the first data set and a second data set, and based on the trend line, predict a time when the oil level of the engine is to be less than or equal to a first limit or greater than or equal to a second limit;

the remedial action module is configured to perform the remedial action based on the plurality of slopes and the estimated time;

the oil level trend includes a slope between the adjusted one of the N oil levels and a second oil level;

the N oil levels include the second oil level;

the second data set is stored in the ring array;

the second limit is greater than the first limit; and the plurality of slopes includes the slope between the adjusted one of the N oil levels and the second oil level.

11. The oil monitoring system of claim 10, wherein the limit module is configured to determine the oil level trend only if the amount of time the engine is off is greater than the amount of time for the oil to drain.

12. A method of monitoring an oil level within an engine of a vehicle, the method comprising:

determining an amount of time the engine is off;

determining an amount of time for oil in the engine to drain;

determining whether the amount of time the engine is off is greater than the amount of time for the oil to drain;

determining N oil levels of the engine, where N is an integer greater than 1;

determining a tilt level of the vehicle or a temperature of the oil;

based on the tilt level of the vehicle or the temperature of the oil, adjusting one of the N oil levels if the amount of time the engine is off is greater than the amount of time for the oil to drain;

determining an oil level trend based on the N oil levels including the adjusted one of the N oil levels;

estimating when a level of oil in the engine is to be outside a predetermined range based on the oil level trend;

during respective stop-start cycles of the engine, determining a plurality of slopes of oil level versus cumulative engine run time curves based on pairs of the N oil levels and respective cumulative engine run times;

performing a first remedial action based on the when the level of the oil is estimated to be outside the predetermined range; and generating a first warning message based collectively on the plurality of slopes.

13. The method of claim 12, wherein the one of the N oil levels is determined based on the temperature and the tilt level of the vehicle.

14. The method of claim 12, further comprising:

estimating an amount of time until the level of the oil in the engine is outside the predetermined range;

comparing the amount of time to a first time threshold and to a second time threshold;

performing the first remedial action when the amount of time is greater than the first time threshold and less than the second time threshold;

performing a second remedial action when the amount of time is less than the first time threshold, wherein the first time threshold is less than the second time threshold;

generating the first warning message when the amount of time is greater than the first time threshold and less than the second time threshold; and generating a second warning message when the amount of time is less than the first time threshold.

15. The method of claim 12, further comprising:

storing data sets in memory, wherein each of the data sets is associated with a respective stop-start cycle of the engine; and determining a slope of an oil level versus cumulative engine run time curve based on two of the N oil levels and respective cumulative engine run times for each of the stop-start cycles, wherein the plurality of slopes include the slopes determined for the stop-start cycles of the engine, and wherein each of the data set includes one of the N oil levels, a cumulative engine run time corresponding to the one of the N oil levels, and one of the slopes.

16. The method of claim 15, further comprising:

data fitting the data sets to generate a trend line; and determining when the level of the oil in the engine is to be outside the predetermined range based on the trend line.

17. The method of claim 12, further comprising:

determining an average amount of engine run time between stop-start cycles of the engine, wherein the average amount of engine run time refers to an average amount of time the engine is ON between consecutive ones of the stop-start cycles;

determining a plurality of time thresholds based on the average amount of engine run time;

storing data sets in memory, wherein each of the data sets is associated with a respective stop-start cycle of the engine;

estimating an amount of time until the level of the oil in the engine is outside the predetermined range based on the data sets, the oil level trend and a limit;

comparing the plurality of time thresholds to the amount of time until the level of the oil in the engine is estimated to be outside the predetermined range, wherein the plurality of time thresholds include a first threshold and a second threshold; and performing the first remedial action if the amount of time until the level of the oil in the engine is estimated to be outside the predetermined range is greater than a first threshold or less than a second threshold, wherein the first threshold is less than the second threshold.

18. The method of claim 17, further comprising:
determining a slope of an oil level versus cumulative engine run time curve based on a last two most recently determined ones of the N oil levels and respective cumulative engine run times for each of the stop-start cycles, wherein the plurality of slopes include the slopes determined for the stop-start cycles of the engine, and wherein each of the data sets includes one of the N oil levels, a cumulative engine run time corresponding to the one of the N oil levels, and one of the slopes; and generating the first warning message based on the slope of the oil level versus cumulative engine run time curve determined based on the last two most recently determined ones of the N oil levels and respective cumulative engine run times for each of the stop-start cycles.

* * * * *